US006963163B2

(12) United States Patent
Nakatera et al.

(10) Patent No.: US 6,963,163 B2
(45) Date of Patent: Nov. 8, 2005

(54) COLOR CATHODE RAY TUBE HAVING DC MAGNETIC FIELD DURING DEGAUSSING PROCESS

(75) Inventors: Shigeo Nakatera, Hirakata (JP); Takayuki Yonezawa, Takatsuki (JP); Tomohisa Mikami, Ibaraki (JP); Tetsuro Ozawa, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/324,363

(22) Filed: Dec. 19, 2002

(65) Prior Publication Data

US 2003/0122469 A1 Jul. 3, 2003

(30) Foreign Application Priority Data

Dec. 28, 2001 (JP) ............................ 2001-400827

(51) Int. Cl.[7] ............................ H04N 9/29; H01J 1/52; H01J 19/40

(52) U.S. Cl. .......................... 313/402; 313/313; 315/8; 315/85

(58) Field of Search ................................ 313/402, 426, 313/430, 433, 313, 440; 315/8, 1, 85; 361/149, 361/150; 348/820

(56) References Cited

U.S. PATENT DOCUMENTS 4,262,232 A * 4/1981 Willis ............................ 315/8
4,734,620 A * 3/1988 Hemme .......................... 315/8
5,168,195 A * 12/1992 Breidigan et al. ............. 315/8
5,754,007 A * 5/1998 Yoshida et al. ................ 315/8

FOREIGN PATENT DOCUMENTS

JP 6-6817 1/1994
JP 7-336710 12/1995
JP 9-135452 5/1997
JP 2001238225 A * 8/2001 ............ H04N 9/29
JP 2002199412 A * 7/2002 ............ H04N 9/29

* cited by examiner

*Primary Examiner*—Karabi Guharay
(74) *Attorney, Agent, or Firm*—Hamre, Schumann, Mueller & Larson, P.C.

(57) ABSTRACT

A color cathode ray tube having a striped phosphor screen is provided, in which color displacements due to the tube axis (Z-axis) component of the terrestrial magnetism can be decreased at low cost. A positive temperature coefficient thermistor and a degaussing coil are connected in series to an AC power source (AC 100V) via a switch. A rectifier/smoothing circuit is provided in parallel to the positive temperature coefficient thermistor. When the switch is turned on, an ordinary degaussing process due to the AC attenuating magnetic field interlinked to the degaussing coil is performed, and the DC magnetic field in the Y-axis direction interlinked to the degaussing coil decreases the influence of the terrestrial magnetism in the tube axis direction (Z-axis direction).

7 Claims, 9 Drawing Sheets

COLOR CATHODE RAY TUBE HAVING DC MAGNETIC FIELD DURING DEGAUSSING PROCESS

FIELD OF THE INVENTION

The present invention relates to color cathode ray tubes used for television receivers or information processing apparatuses. More specifically, the present invention relates to color cathode ray tubes having a striped phosphor screen, that are provided with a degaussing function for the prevention of color displacements due to tube axis (Z axis) components of the terrestrial magnetism.

BACKGROUND OF THE INVENTION

FIG. 10 illustrates the basic configuration of an ordinary color cathode ray tube used for a television receiver or the like. As shown in FIG. 10, the color cathode ray tube deflects an electron beam 3 emitted from an electron gun 2 with a deflection yoke 4 in the vertical direction and the horizontal direction, and reproduces an image by scanning the electron beam 3 over the entire screen.

A television receiver using such a color cathode ray tube is affected by the terrestrial magnetism. This means that on the earth, there is a magnetic field caused by the terrestrial magnetism, and when the terrestrial magnetism acts on the color cathode ray tube, then the electron beam 3 is distorted by the Lorentz force. As a result, mislanding occurs so that the electron beam 3 does not reach the predetermined location on the phosphor screen 9 provided on the inner side of the face panel 8, thus causing color displacements. To prevent these color displacements, ordinarily a degaussing coil is arranged around the color cathode ray tube, and a degaussing process removing the polarization of, for example, an inner magnetic shield 7 is carried out (see for example JP9 (1997)-135452A).

Moreover, JP6 (1994)-6817A proposes a technology in which a magnetic field correction coil is provided, and the degaussing process is carried out while intensifying the terrestrial magnetism.

However, in color cathode ray tubes having a striped phosphor screen, mislanding of the electron beam is caused by the Lorentz force $F_x$ which acts on the electron beam in the horizontal direction (X-axis direction). This Lorentz force $F_x$ affects the electron beam due to magnetic fields in the vertical direction (Y-axis direction) and in the tube axis direction (Z-axis direction), and can be expressed by $$F_x = e(B_y v_z - B_z v_y) \qquad \text{Equation 1}$$

wherein e is the charge of an electron, $B_y$ is the magnetic flux density in the Y-axis direction, $v_y$ is the speed of the electron beam in the Y-axis direction, $B_z$ is the magnetic flux density in the Z-axis direction (tube axis direction), and $v_z$ is the speed of the electron beam in the Z-axis direction (tube axis direction).

Here, the speed $v_y$ of the electron beam in the Y-axis direction and the speed $v_z$ of the electron beam in the Z-axis direction are determined by the operating voltage and the deflection angle of the electron beam. Consequently, to prevent color displacement, it is necessary to adjust the balance between the magnetic flux density $B_y$ in the Y-axis direction and the magnetic flux density $B_z$ in the Z-axis direction (tube axis direction) so as to reduce the Lorentz force $F_x$ that the electron beam experiences in the horizontal direction (X-axis direction).

Owing to the structure of cathode ray tubes, the trajectory of the electron beam must be preserved, so that it is not possible to block the magnetic field in the Z-axis direction (tube axis direction) with an inner magnetic shield. Thus, when the terrestrial magnetism acts in the tube axis direction (Z-axis direction), most of the magnetism cannot be blocked, so that the magnetic flux density $B_z$ in the Z-axis direction (tube axis direction) becomes large. In this case, in order to reduce the Lorentz force $F_x$ experienced by the electron beam in the horizontal direction (X-axis direction), it is necessary to produce a $B_y$ that is large enough to cancel the $B_z$ term ($B_z v_y$), but with the conventional technology of the above-mentioned JP9 (1997)-135452A, it is not possible to produce a $B_y$ that is sufficiently large to cancel the $B_z$ term ($B_z v_y$).

Furthermore, in the technology disclosed in JP H06-6817A, a magnetic field correction coil is provided so as to perform a degaussing process while intensifying the terrestrial magnetism, but at least a pair of magnetic field correction coils are necessary to intensify the terrestrial magnetism. Consequently, using the technology disclosed in this publication, the number of components increases, and there is the problem that costs rise. Furthermore, if that technology is used, there is also the problem that it is not possible to reduce the influence of the terrestrial magnetism uniformly across the entire screen, since the correction response differs between the screen corner portions and other regions.

It is thus an object of the present invention to present a color cathode ray tube provided with a degaussing function that can reduce at low cost the influence of magnetic fields remaining after an ordinary degaussing process and of external magnetic fields on the trajectory of an electron beam. More specifically, it is an object of the present invention to present a color cathode ray tube that has a striped phosphor screen and that is provided with a degaussing function with which color displacements caused by the tube axis (Z-axis) component of the terrestrial magnetism can be decreased at low cost.

SUMMARY OF THE INVENTION

In order to achieve these objects, a color cathode ray tube in accordance with the present invention includes a bulb including a face panel having on its inner surface a phosphor screen made of phosphors of a plurality of colors, and a funnel connected to the rear of the face panel; an electron gun installed in a neck portion of the funnel; a shadow mask having a plurality of apertures for passing an electron beam emitted from the electron gun, and arranged with a predetermined spacing from the phosphor screen; and an inner magnetic shield extending from a rear portion of the shadow mask toward the electron gun. A direct current (DC) magnetic field is applied during a degaussing process period.

With the color cathode ray tube of this configuration, the influence of the magnetic field remaining after an ordinary degaussing process and external magnetic fields on the trajectory of the electron beam can be decreased by applying the DC magnetic field, so that it is not necessary to provide the inner magnetic shield with a complicated shape. As a result, the costs for the inner magnetic shield can be decreased. Moreover, by applying the DC magnetic field during the degaussing process period and controlling this DC magnetic field, it is possible to magnetize magnetic parts, such as the inner magnetic shield, such that a magnetic flux density is attained that is sufficient to decrease the influence of an external magnetic field.

In this configuration of the color cathode ray tube, it is preferable that the phosphor screen is a striped phosphor screen made of phosphor stripes of the colors R (red), G (green) and B (blue) extending in vertical direction (Y-axis direction) of the bulb, which are lined up repeatedly in that order in the horizontal direction (X-axis direction), and the DC magnetic field is applied in the vertical direction. In color cathode ray tubes having a striped phosphor screen, color displacements occur when the electron beam emitted from the electron gun is subjected to a Lorentz force in the horizontal direction, but these color displacements can be prevented by applying the DC magnetic field in the vertical direction.

In this case, it is preferable that the DC magnetic field is generated near an end face of the inner magnetic shield on the electron gun side, because the strength of the magnetic field inside the cathode ray tube after an ordinary degaussing process with a degaussing coil increases near the end face of the inner magnetic shield on the electron gun side.

Furthermore, it is preferable that the DC magnetic field is applied in vertical symmetry with respect to the tube axis (Z-axis), because the Lorentz forces in the horizontal direction acting on the electron beam are opposite when the destination point of the electron beam is below and when it is above the horizontal center line on the phosphor screen.

Furthermore, it is preferable that the strength and orientation of the DC magnetic field are adjusted in accordance with the strength and orientation of a tube axis component of the terrestrial magnetism.

In the color cathode ray tube configured as described above, it is preferable that the DC magnetic field is generated by superimposing a DC current on a degaussing coil mounted on the funnel. With this preferable configuration, the influence of the magnetic field remaining after an ordinary degaussing process and external magnetic fields on the trajectory of the electron beam can be decreased by superimposing a suitable DC current on a existing degaussing coil, so that color displacements can be prevented at low cost. Moreover, by adjusting the shape of the degaussing coil, the influence of the magnetic field remaining after an ordinary degaussing process and of external magnetic fields on the trajectory of the electron beam can be decreased uniformly across the entire screen, so that color placements can be prevented across the entire screen.

In the color cathode ray tube configured as described above, it is preferable that a ring coil for generating the DC magnetic field is provided. Furthermore, in that case, it is preferable that the ring coil's shape is that of an ellipse with a long axis in the vertical direction or that of a rectangle that is oblong in the vertical direction. With this preferable configuration, the correction response can be adjusted to the same value at the corner portions of the screen and at other portions, so that the influence of the magnetic field remaining after an ordinary degaussing process and of external magnetic fields on the trajectory of the electron beam can be decreased uniformly across the entire screen.

DESCRIPTION OF THE PREFERRED EMBODIMENTS

The following is a more detailed description of the present invention with reference to preferred embodiments.

Figure 10:
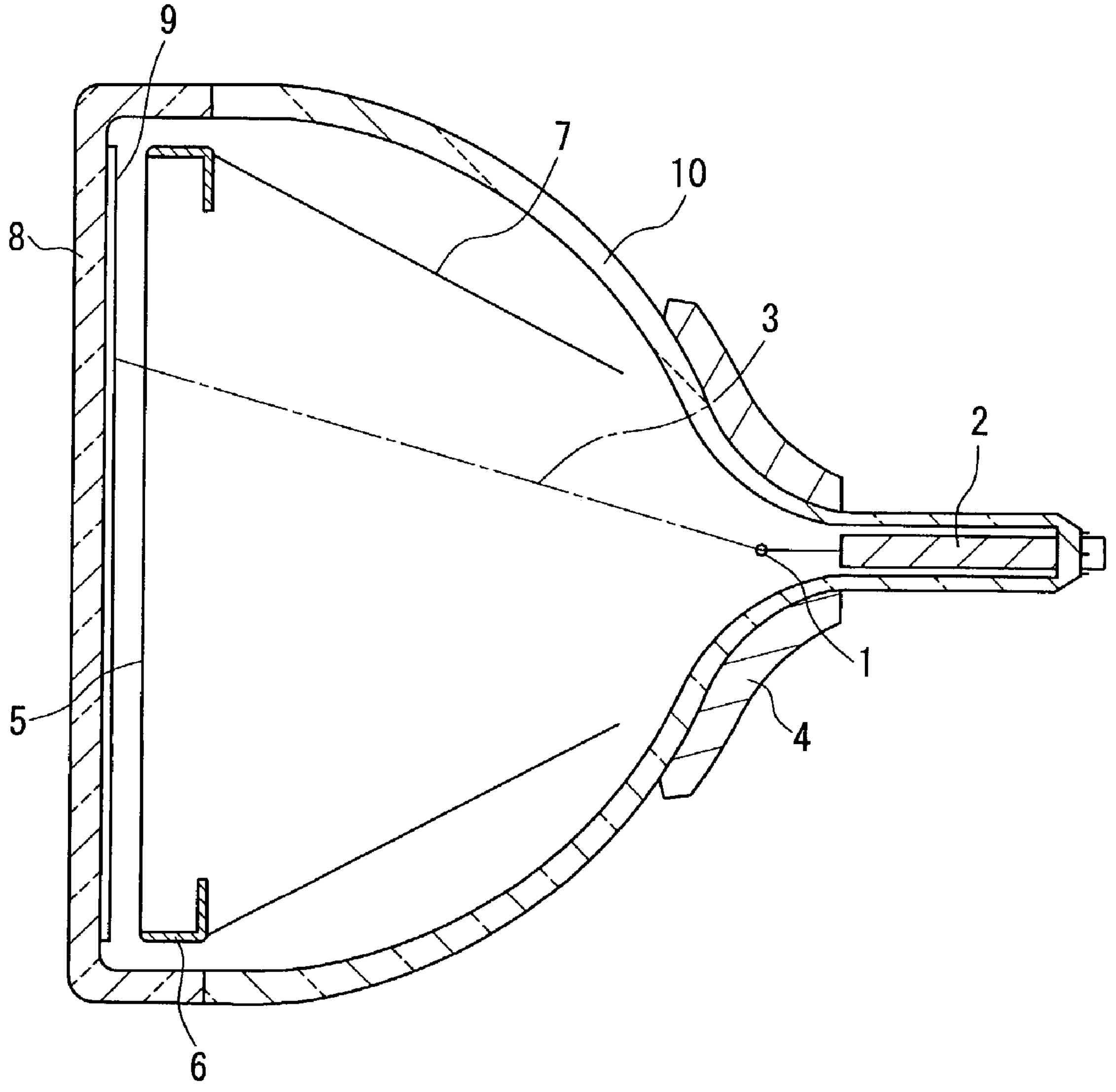
FIG. 10 PRIOR ART
FIG. 10 is a cross-sectional view showing the basic configuration of an ordinary color cathode ray tube.

The basic structure and principle of image reproduction of the color cathode ray tube in this embodiment is the same as in the ordinary color cathode ray tube shown in FIG. 10. Consequently, this embodiment is described also with reference to FIG. 10.

Figure 1:
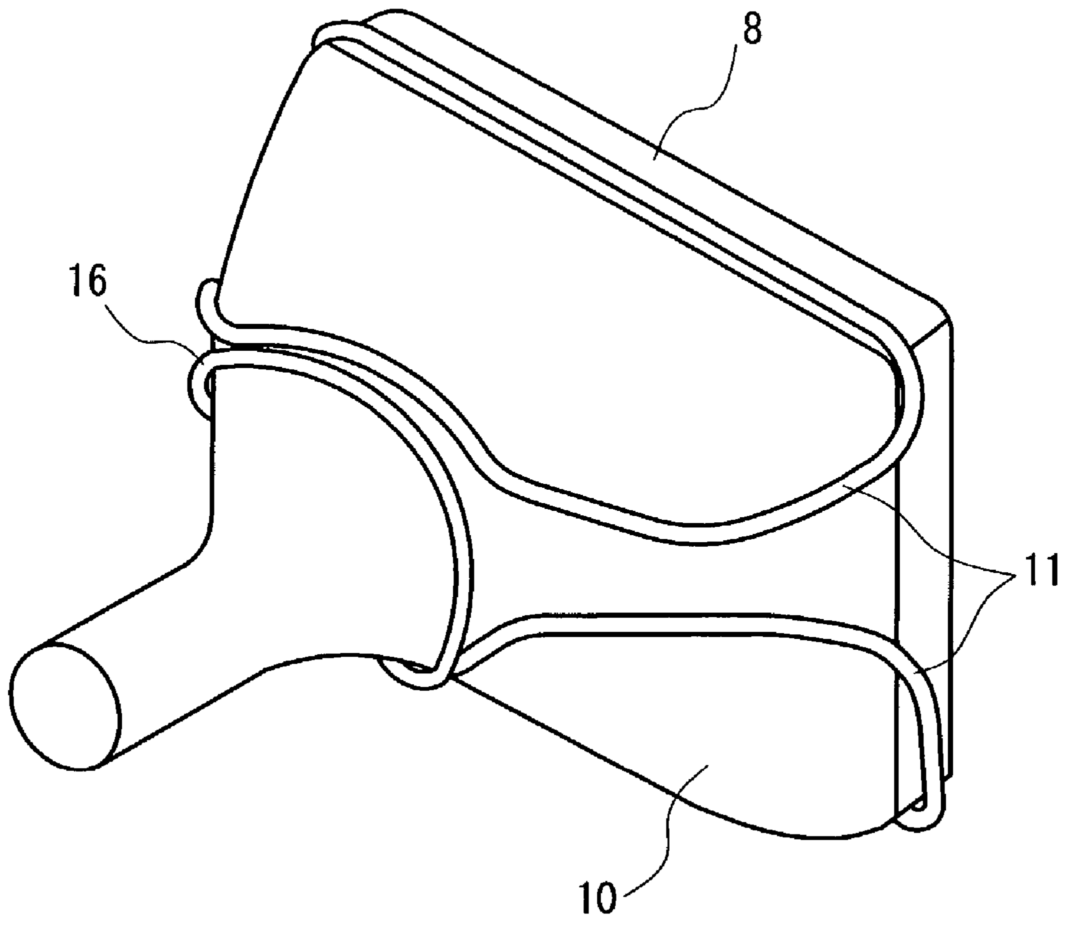
FIG. 1 is a perspective view of a color cathode ray tube provided with a degaussing function in accordance with an embodiment of the present invention, taken from the rear side (neck portion side).
Figure 2:
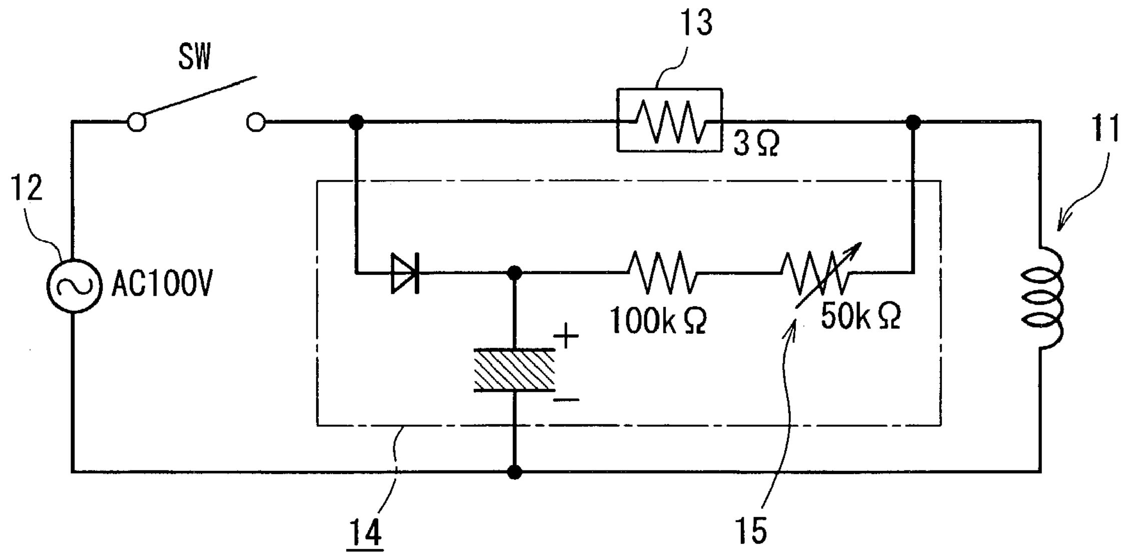
FIG. 2 shows a degaussing circuit in a color cathode ray tube provided with a degaussing function in accordance with an embodiment of the present invention.
Figure 3:
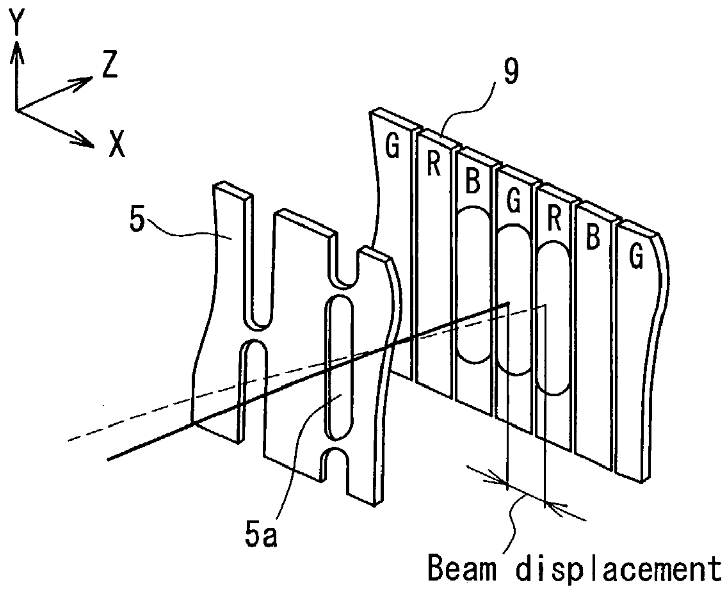
FIG. 3 is a partial perspective view illustrating the change in the positional relation between the shadow mask and the phosphor screen due to the terrestrial magnetism.

FIG. 1 is a perspective view of a color cathode ray tube provided with a degaussing function in accordance with an embodiment of the present invention, taken from the rear side (neck portion side). FIG. 2 shows a degaussing circuit in that cathode ray tube. FIG. 3 is a partial perspective view illustrating the positional relation between the shadow mask and the phosphor screen in that cathode ray tube.

As shown in FIGS. 1 and 10, a color cathode ray tube in accordance with this embodiment includes a bulb, an electron gun 2, a shadow mask 5, a mask frame 6, and an inner magnetic shield 7. The bulb is constructed of a face panel 8 and a funnel 10. The face panel 8 is made of glass or the like and has a phosphor screen 9 on its inner surface. The funnel 10 is connected to the rear of the face panel 8 and is also made of glass or the like. The electron gun 2 is installed in the neck portion of the funnel 10. The shadow mask 5 is arranged at a predetermined position inside the bulb at a predetermined spacing from the phosphor screen 9 on the inner surface of the face panel 8. The mask frame 6 holds the shadow mask 5. The inner magnetic shield 7 is fastened to the mask frame 6 and is arranged from the rear end of the mask frame 6 to the front end of a deflection yoke 4. This deflection yoke 4 for deflecting the electron beam 3 emitted from the electron gun 2 in vertical direction and horizontal direction is disposed around the neck portion of the funnel 10 of the color cathode ray tube. The shadow mask 5, the mask frame 6 and the inner magnetic shield 7 are made of a magnetic material. It should be noted that in FIG. 10, numeral 1 denotes the deflection center of the electron beam 3.

As shown in FIG. 3, the phosphor screen 9 is a striped phosphor screen made of phosphor stripes of the colors R (red), B (blue) and G (green) extending in the Y-axis direction (vertical direction) that are lined up repeatedly in that order in the X-axis direction (horizontal direction). The shadow mask 5 is provided with a plurality of apertures 5*a* that are oblong in the Y-axis direction and pass the electron beams 3 emitted from the electron gun 2. The electron beams 3 corresponding to the colors R, B and G emitted from the electron gun 2 pass through predetermined apertures 5*a* arranged in the shadow mask 5, and collide with the phosphor stripes of colors R, B and G, thus causing the respectively colored phosphor stripes to emit light. Thus, a color image is formed on the face panel 8.

If there is no terrestrial magnetism in the tube axis direction (Z-axis direction), for example, the electron beam 3 corresponding to G collides with the G phosphor stripes undisturbed, causing the G phosphor stripes to emit light (solid line in FIG. 3). However, if there is terrestrial magnetism in the tube axis direction (Z-axis direction), for example, then the electron beam 3 corresponding to G experiences a Lorentz force $F_x$ in the X-axis direction and is distorted (beam displacement) and collides with the R phosphor stripe next to the G phosphor stripe, so that R phosphor stripe is unintentionally caused to emit light (indicated by the broken line in FIG. 3: mislanding), and as a result, color displacement occurs.

The Lorentz force $F_x$ in the X-axis direction can be expressed by $$F_x=e(B_y v_z-B_z v_y) \qquad \text{Equation 2}$$

wherein e is the charge of an electron, $B_y$ is the magnetic flux density in the Y-axis direction, $v_y$ is the speed of the electron beam in the Y-axis direction, $B_z$ is the magnetic flux density in the Z-axis direction (tube axis direction), and $v_z$ is the speed of the electron beam in the Z-axis direction (tube axis direction).

Here, considering the case in which the destination point of the electron beam 3 is below the center line in horizontal direction on the phosphor screen 9, then it is necessary to increase the value of the magnetic flux density $B_y$ in the Y-axis direction toward the negative side in order to decrease the influence of the terrestrial magnetism in the tube axis direction (Z-axis direction) (that is, to diminish the Lorentz force $F_x$ in the X-axis direction acting on the electron beam 3), since the speed $v_z$ of the electron beam in the Z-axis direction (tube axis direction) is positive (+), the magnetic flux density $B_z$ in the Z-axis direction (tube axis direction) is positive, and the speed $v_y$ of the electron beam in the Y-axis direction is negative (−).

Figure 4:
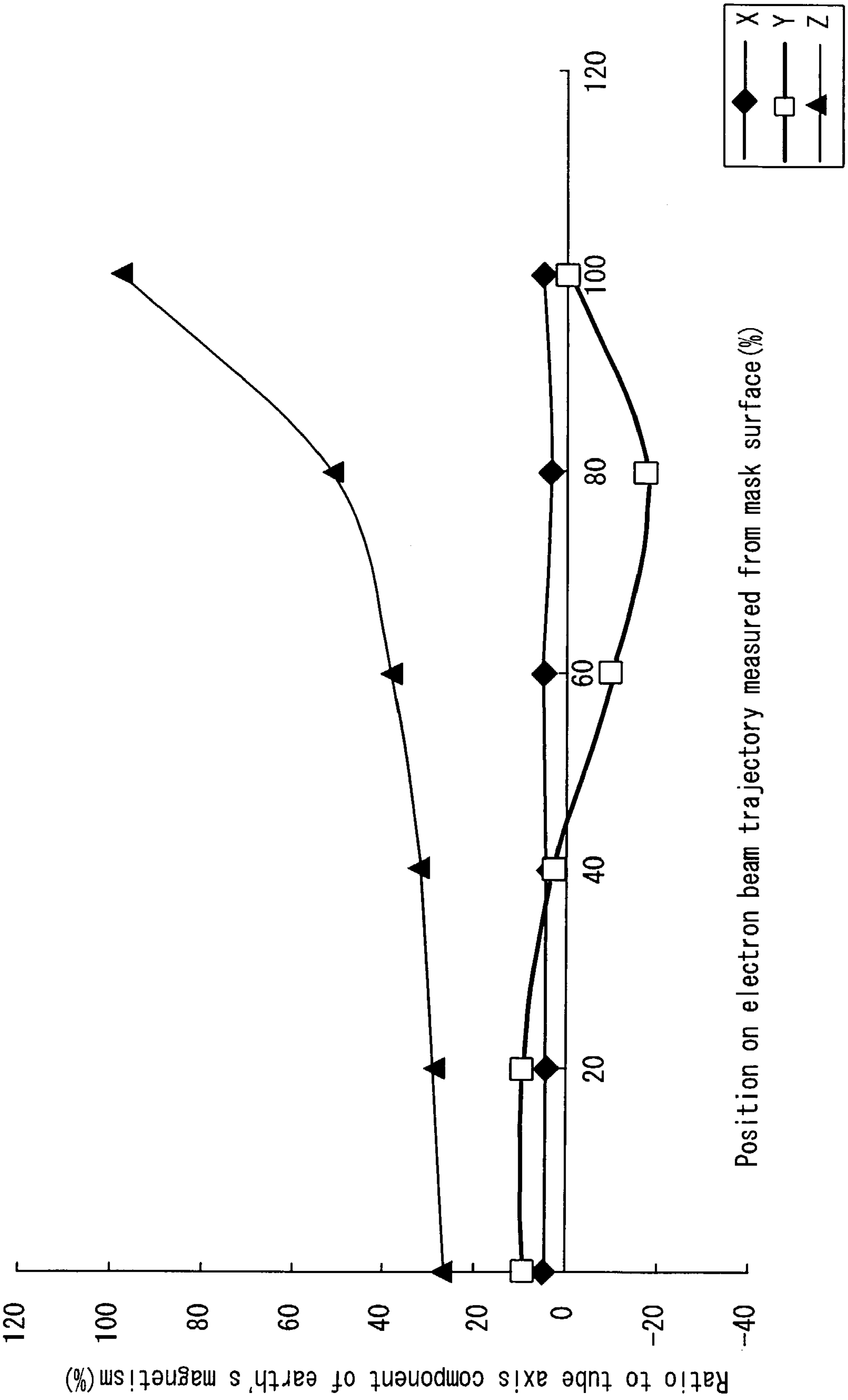
FIG. 4 shows the magnetic field distribution inside a cathode ray tube in accordance with an embodiment of the present invention after an ordinary degaussing process.

The inventors have measured the magnetic flux distribution in a 29" color cathode ray tube of the above-described configuration with a shadow mask 5 made of soft steel, a mask frame 6 made of hot-rolled steel and an inner magnetic shield 7 made of soft steel, wherein the cathode ray tube has been degaussed by an ordinary degaussing coil 11. The measurement of the magnetic flux density was performed using a Hall element. The results are shown in FIG. 4. FIG. 4 shows the magnetic flux density distribution on the S-side (below the XZ-plane) for an terrestrial magnetism component in the tube axis direction (Z-axis direction) of 30 $\mu$T (0.3 G). The horizontal axis shows the position on the electron beam trajectory measured from the plane of the shadow mask 5 normalized to the distance from the plane of the shadow mask 5 to the deflection center 1 of the electron beam 3. That is to say, on the horizontal axis in FIG. 4, "0%" denotes the position of the plane of the shadow mask 5, and "100%" denotes the deflection center 1 of the electron beam 3. The vertical axis in FIG. 4 denotes the ratio (in %) of the measured magnetic flux density with respect to the terrestrial magnetism component in the tube axis direction (Z-axis direction). In FIG. 4, "◆" denotes the magnetic flux density distribution in the X-axis direction, "□" denotes the magnetic flux density distribution in the Y-axis direction, and "▲" denotes the magnetic flux density distribution in the Z-axis direction (tube axis direction). As shown in FIG. 4, on the S-side of the cathode ray tube, the magnetic flux density in the Z-axis direction (tube axis direction) is larger than the magnetic flux densities in the X-axis direction and the Y-axis direction, and it can be seen that the influence of the terrestrial magnetism in the tube axis direction (Z-axis direction) is large.

In order to address this, in accordance with the present embodiment, a degaussing circuit including a degaussing coil 11 is configured as described below, in order to attain a magnetic flux density $B_y$ in the Y-axis direction that is large enough to decrease the influence of the terrestrial magnetism in the tube axis direction (Z-axis direction).

Figures 5A, 5B:
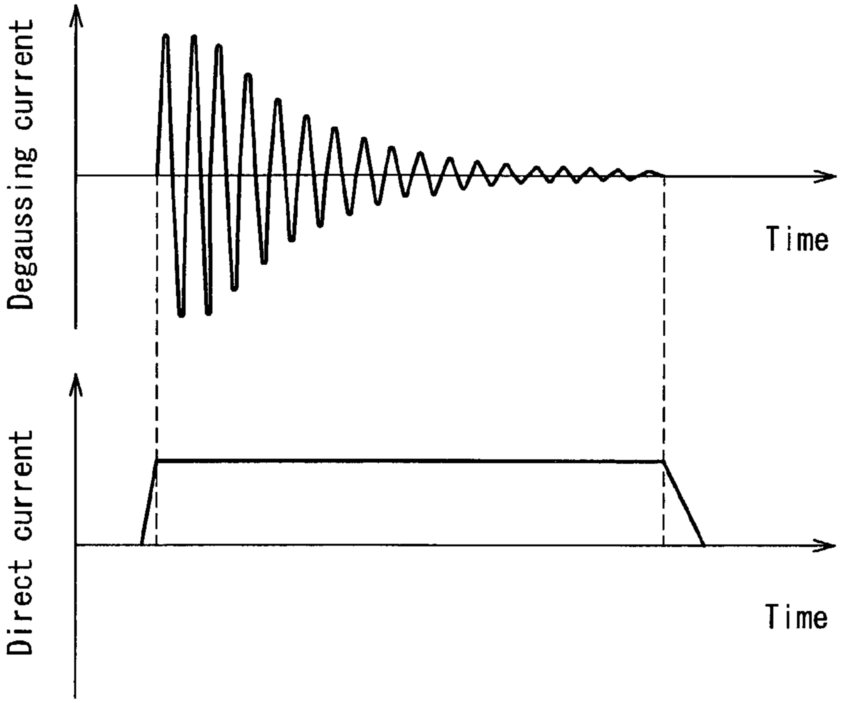
FIG. 5 shows the relationship between the degaussing current and the DC current in an embodiment of the present invention.

As shown in FIG. 2, the degaussing coil 11 and a positive temperature coefficient thermistor 13 are connected in series to an AC power source (AC 100V) 12 via a switch SW. Here, the positive temperature coefficient thermistor 13 is a resistance element for damping current. When current flows, it heats up and resistance becomes high. Consequently, when the switch SW is turned on, a large degaussing current that gradually attenuates as time passes is supplied to the degaussing coil 11 (see FIG. 5A). Thus, an AC attenuating magnetic field interlinked with the degaussing coil 11 is generated, and thus the shadow mask 5, the mask frame 6 and the inner magnetic shield 7, which are made of magnetic material, are degaussed (this is the above-mentioned "ordinary degaussing process)." Moreover, the degaussing circuit is further provided with a rectifier/smoothing circuit 14 arranged in parallel to the positive temperature coefficient thermistor 13. Consequently, when the switch SW is turned on, a DC current flows through the rectifier/smoothing circuit 14 and is superimposed on the degaussing coil (see FIG. 5B), thus generating a DC magnetic field in the Y-axis direction, interlinked with the degaussing coil 11. Thus, the shadow mask 5, the mask frame 6 and the inner magnetic shield 7, which are made of magnetic material, are magnetized in the Y-axis direction, thus attaining a magnetic flux density $B_y$ in the Y-axis direction for decreasing the influence of the terrestrial magnetism in the tube axis direction (Z-axis direction). Here, the DC magnetic field is applied during the time of the degaussing process. That is to say, the switch SW is turned off by a timer at a proper time when the degaussing current has sufficiently attenuated, thus terminating the superimposition of the DC current to the degaussing coil 11.

Now, when the degaussing process is performed in a situation in which the external magnetic field is zero, then the residual magnetization of the magnetic parts, namely the shadow mask 5, the mask frame 6 and the inner magnetic shield 7, becomes zero. However, if the degaussing process is performed in a situation in which a DC magnetic field is applied, then the residual magnetization does not become zero, and a residual magnetization corresponding to the strength of the DC magnetic field is generated. That is to say, by controlling the applied DC magnetic field, it is possible to freely control the residual magnetization of magnetic parts, such as the inner magnetic shield 7.

Consequently, by applying the DC magnetic field as described above during the degaussing process period and controlling this DC magnetic field, it is possible to perform a magnetization with which a magnetic flux density $B_y$ in the Y-axis direction is attained that is sufficient to decrease the influence of the terrestrial magnetism in the tube axis direction (Z-axis direction) on the magnetic parts, such as the inner magnetic shield 7.

Figure 6:
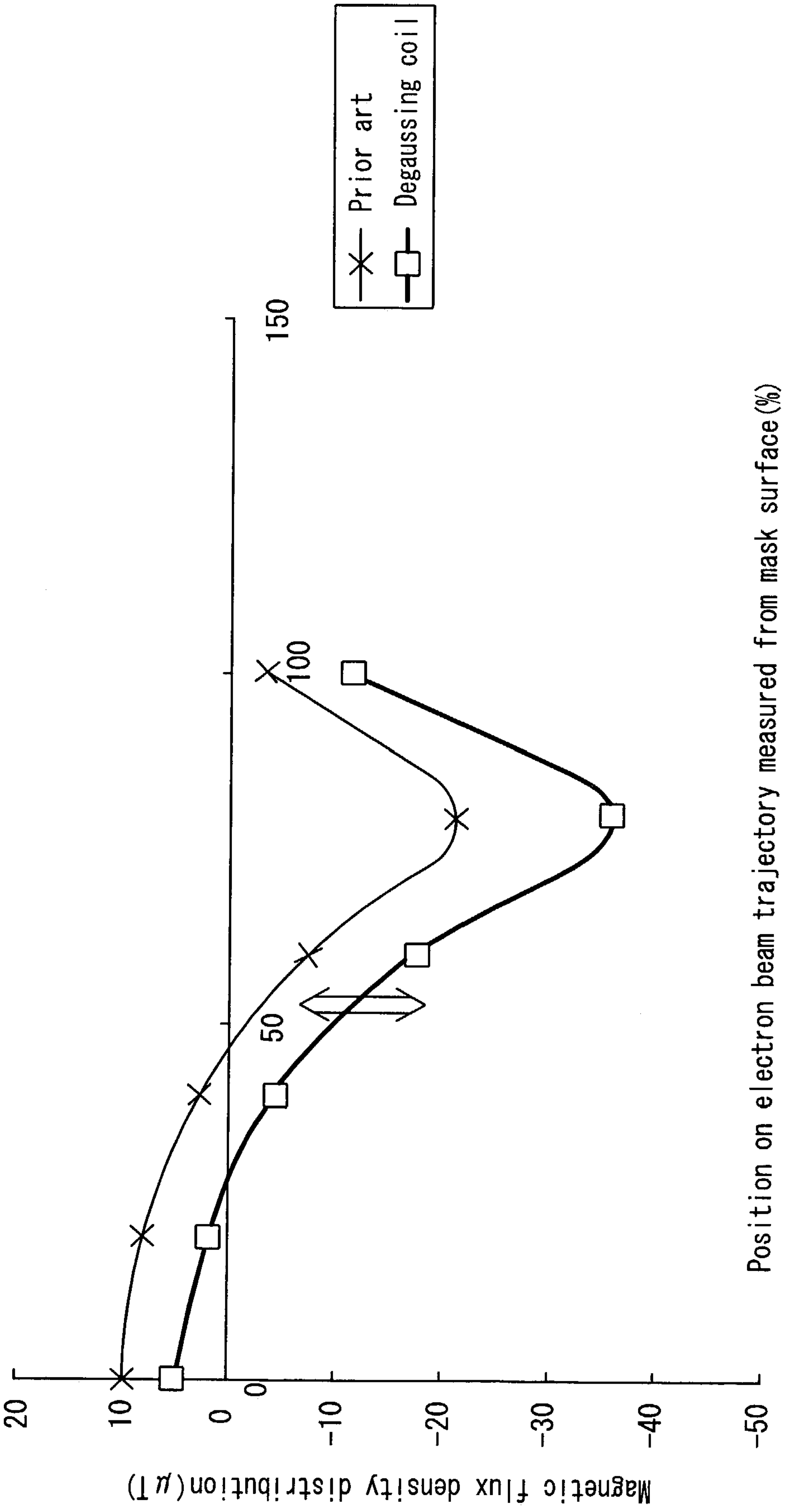
FIG. 6 shows the magnetic flux density distribution in the vertical direction inside a cathode ray tube in accordance with an embodiment of the present invention when a DC current is superimposed and when no DC current is superimposed on the degaussing coil.

Using a similar 29" color cathode ray tube as above, the inventors measured the magnetic flux density distribution in the Y-axis direction inside the cathode ray tube when a DC current of 40 mA was superimposed on the degaussing coil 11 while performing an ordinary degaussing process. FIG. 6 shows the results (solid line). FIG. 6 also shows the magnetic flux density distribution in the Y-axis direction inside the cathode ray tube when no DC current is superimposed on the degaussing coil 11 (broken line). In FIG. 6, as in FIG. 4, the horizontal axis shows the position on the electron beam trajectory measured from the plane of the shadow mask 5 normalized to the distance from the plane of the shadow mask 5 to the deflection center 1 of the electron beam 3. As shown in FIG. 6, the magnetic flux density By near the end face of the inner magnetic shield 7 on the side of the electron gun 2 assumes a more negative value, regardless of the presence of the DC current superimposed on the degaussing coil 11, and when the DC current is superimposed on the degaussing coil 11, the magnetic flux density By near the end face of the inner magnetic shield 7 on the side of the electron gun 2 assumes an even larger negative value.

Figure 7:
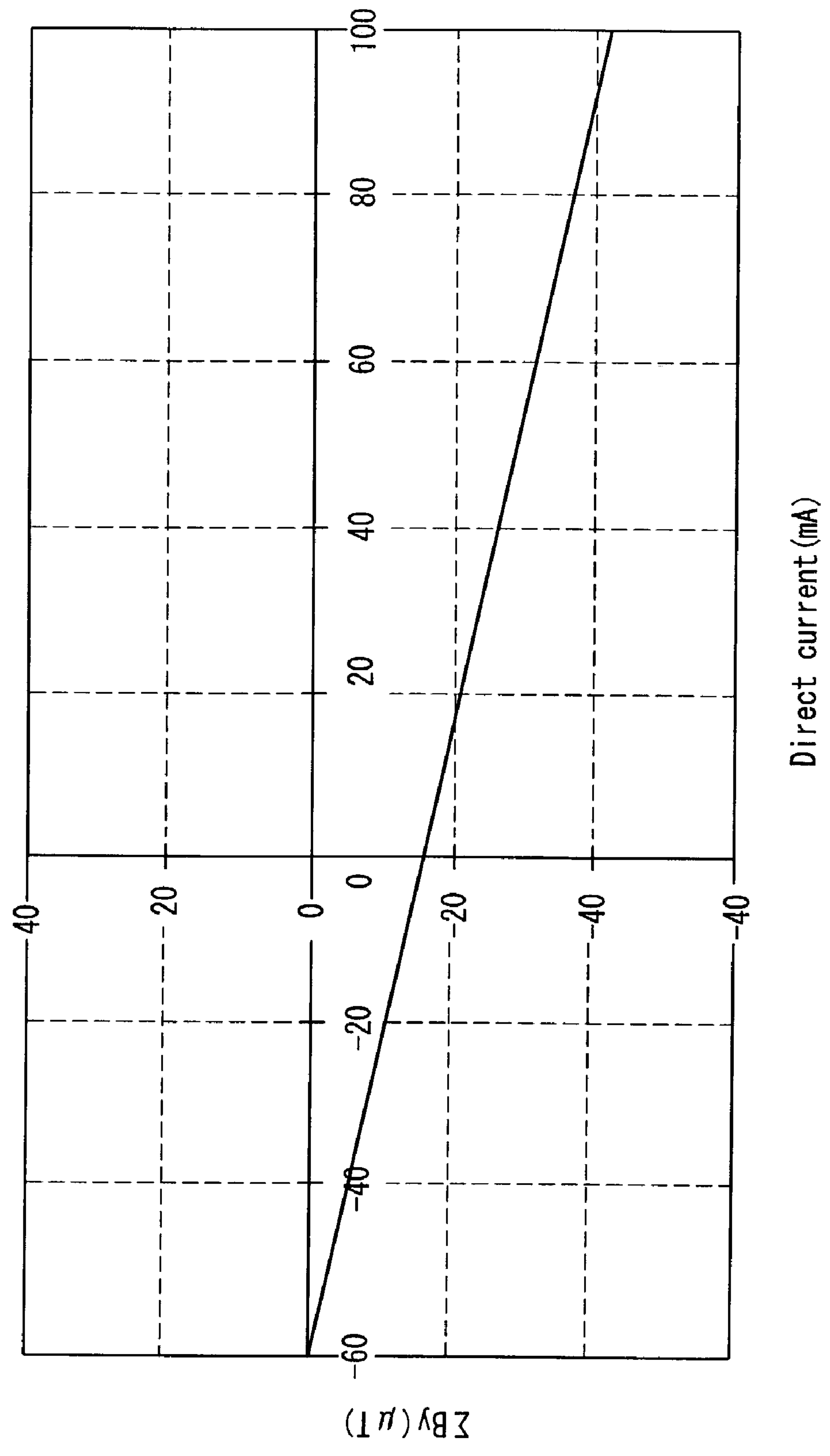
FIG. 7 shows the relationship between the value of the DC current and the sum of the magnetic field density distribution in the vertical direction inside a cathode ray tube in accordance with an embodiment of the present invention.

Furthermore, using a similar 29" color cathode ray tube as above, the inventors studied the relation between the DC current and the sum of the magnetic flux density distribution in the Y-axis direction from the shadow mask 5 inside the cathode ray tube to the end face of the inner magnetic shield 7 on the side of the electron gun 2 when a DC current is superimposed on the degaussing coil 11. FIG. 7 shows the results. As shown in FIG. 7, it was found that the sum $\Sigma B_y$ of the magnetic flux density distribution in the Y-axis direction changes proportionally with the DC current that is superimposed on the degaussing coil 11.

Consequently, by changing the value of the DC current superimposed on the degaussing coil 11, it is possible to freely control the sum $\Sigma B_y$ of the magnetic flux density distribution (see FIG. 6). Thus, by changing the DC current superimposed on the degaussing coil 11 in accordance with the size of the terrestrial magnetism in the tube axis direction (Z-axis direction), it is possible to produce a magnetic flux density $B_y$ in the Y-axis direction that is sufficient to cancel the $B_z$ term ($B_z v_y$) in Equation 2. As a result, the influence of the terrestrial magnetism in the tube axis direction (Z-axis direction) can be reduced reliably, and mislanding of the electron beams 3, and as a consequence, color displacement can be prevented.

The following is a description of a specific method for reducing the influence of the terrestrial magnetism in the tube axis direction (Z-axis direction).

A color cathode ray tube was equipped with a flux-gate magnetism sensor (not shown in the drawings) for detecting the strength and the orientation of the terrestrial magnetism in the tube axis direction (Z-axis direction). Then, the value of the DC current superimposed on the degaussing coil 11 was determined by changing the resistance of the variable resistor 15 in the rectifier/smoothing circuit 14 in accordance with the strength and the orientation of the terrestrial magnetism in the tube axis direction (Z-axis direction) detected with this magnetism sensor. It should be noted that the value of the DC current corresponding to the size of the terrestrial magnetism in the tube axis direction (Z-axis direction), that is, the magnetic flux density $B_y$ in the Y-axis direction that is sufficient to cancel the $B_z$ term ($B_z v_y$) in Equation 2 has been calculated beforehand, and the resistance of the variable resistor 15 in the rectifier/smoothing circuit 14 is determined accordingly. Consequently, it is possible to determine a suitable value of the DC current to be superimposed on the degaussing coil 11 and to reliably reduce the influence of the terrestrial magnetism in the tube axis direction (Z-axis direction) when placing the color cathode ray tube in any location and in any orientation.

Figure 8:
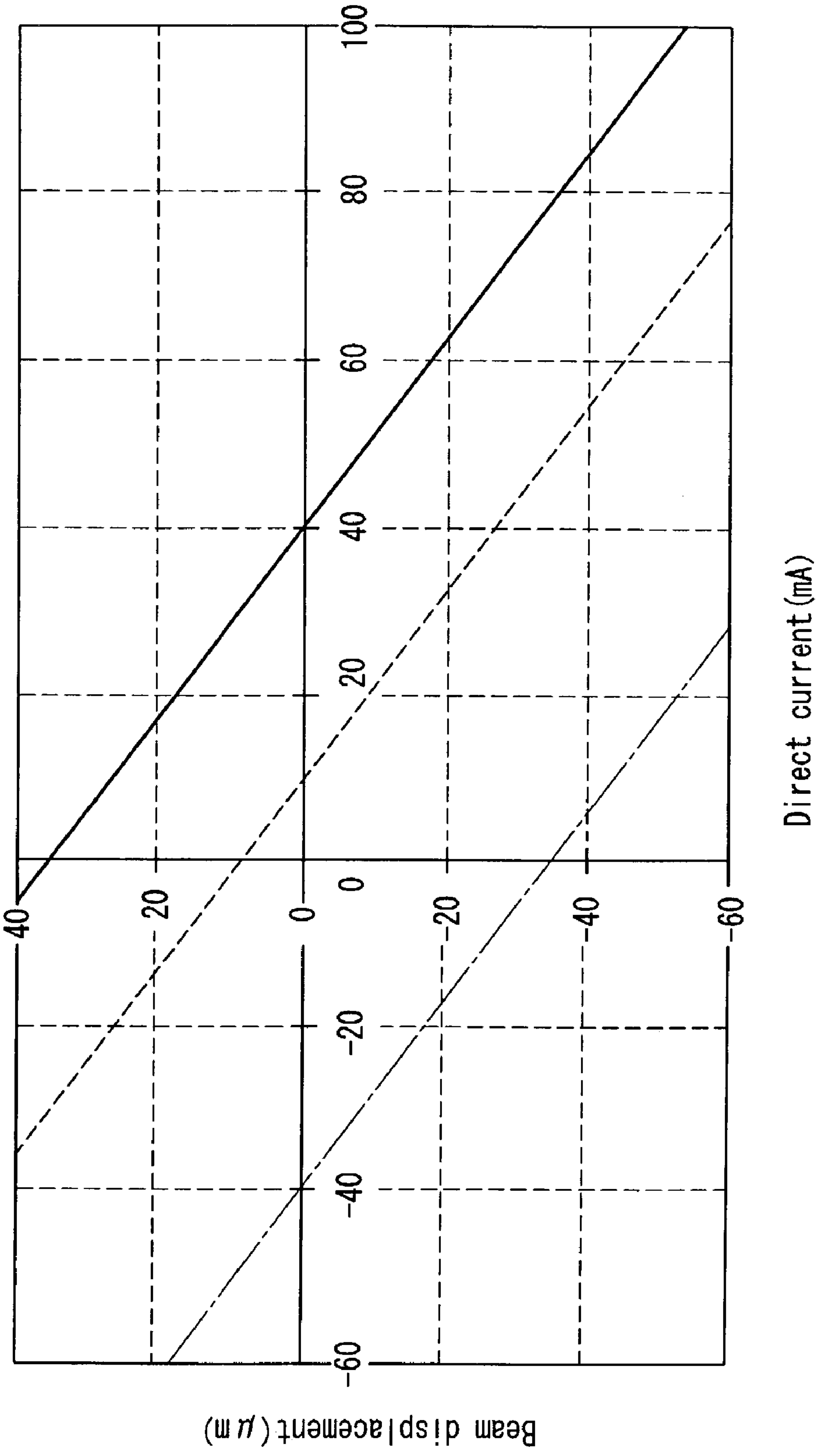
FIG. 8 shows the relationship between the value of the DC current superimposed on the degaussing coil and the beam displacement in accordance with an embodiment of the present invention.

Using a similar 29'color cathode ray tube as above, the inventors further studied the relationship between the beam displacement and the value of the DC current superimposed on the degaussing coil 11, when the horizontal component of the terrestrial magnetism was 50 $\mu$T (corresponds to the value at the equator), and when the orientation of the horizontal component of the terrestrial magnetism coincides with the orientation of the tube axis (Z-axis, i.e. the direction from the electron gun 2 to the face panel 8). The results are shown in FIG. 8. As shown in FIG. 8, when the DC current is 40 mA, the beam displacement was zero. Thus, the beam displacement due to the influence of the terrestrial magnetism in the tube axis direction (Z-axis direction) is ideally zero, but in practice there will be a certain tolerance range. For example in the case of the 29" color cathode ray tube, the tolerance range for beam displacement is within 20 $\mu$m. It should be noted that when the orientation of the tube axis is shifted away from the orientation of the horizontal component of the terrestrial magnetism, then the relationship between the value of the DC current and the beam displacement is shifted toward the direction indicated by the broken line in FIG. 8, and when the orientation of the tube axis becomes opposite to the orientation of the horizontal component of the terrestrial magnetism, then the relation between the value of the DC current and the beam displacement becomes as indicated by the dash-dotted line in FIG. 8. That is to say, when the value of the DC current is −40 mA, the beam displacement becomes zero.

In the foregoing, the case was described in which the destination point of the electron beam 3 lies below the center line in horizontal direction on the phosphor screen 9. But when the case is considered in which the destination point of the electron beam 3 lies above the center line in horizontal direction on the phosphor screen 9, then the speed $v_z$ of the electron beam in Z-axis direction (tube axis direction), the magnetic flux density $B_z$ in the Z-axis direction (tube axis direction), and the speed $v_y$ of the electron beam in the Y-axis direction in Equation 2 are all positive, so that the magnetic flux density $B_y$ in the Y-axis direction should assume a more positive value to reduce the influence of the terrestrial magnetism in the tube axis direction (Z-axis direction).

Consequently, in the case that the destination point of the electron beam 3 is below the center line in the horizontal direction on the phosphor screen 9 and in the case that it is above that line, it is necessary to apply a DC magnetic field in the vertical direction of the color cathode ray tube that is vertically symmetric with respect to the tube axis, in order to reduce the influence of the terrestrial magnetism in the tube axis direction (Z-axis direction). Therefore, degaussing coils 11 are arranged on the rear face of the color cathode ray tube at an upper and at a lower portion on the outer side of the funnel 10, as shown in FIG. 1, and a desired DC current is superimposed on the degaussing coils 11.

Thus, in this embodiment, a DC magnetic field is generated in the Y-axis direction by superimposing a desired DC current on an existing degaussing coil 11 to reduce the influence of the terrestrial magnetism in the tube axis direction (Z-axis direction) and to keep beam displacement within the tolerance range, so that color displacements due to the tube axis (Z-axis) component of the terrestrial magnetism can be prevented at low cost. Moreover, when the influence of the terrestrial magnetism in the tube axis direction (Z-axis direction) is reduced in this manner by generating a DC magnetic field, then it is not necessary to provide an inner magnetic shield with a complicated shape, so that it becomes possible to reduce the costs of the inner magnetic shield. Moreover, the influence of the terrestrial magnetism can be eliminated almost completely, so that the guard band due to the black matrix can be scaled down, improving the contrast.

By adjusting the shape of the degaussing coil 11, the influence of the terrestrial magnetism can be reduced uniformly across the entire screen, so that it is possible to prevent color displacement across the entire screen.

In ordinary color cathode ray tubes that are not provided with means for preventing beam displacements caused by the terrestrial magnetism in the tube axis direction (Z-axis direction) as in this embodiment, the effect of shielding the tube axis magnetic field with the shadow mask 5 itself is improved by increasing the panel thickness of the shadow mask 5. On the other hand, in this embodiment, the influence of the tube axis (Z-axis) component of the terrestrial magnetism that has entered the cathode ray tube is decreased by generating a DC magnetic field, so that there is no need to employ such a means for shielding the tube axis magnetic field. As a result, it is not necessary to consider the magnetic shield effect in the design of the shadow mask 5, for example, when deciding its panel thickness. Consequently, the shadow mask 5 can be made thin, within a range in which its strength can be maintained without deformation, so that the transmissivity of the electron beam can be increased and the brightness can be enhanced. Moreover, making the shadow mask 5 thinner simplifies the etching of the apertures 5*a* in the shadow mask 5, so that the cost for the shadow mask 5 can be reduced.

In this embodiment, a DC current is superimposed on the degaussing coil 11 to generate a DC magnetic field, but there is no limitation to this configuration. For example, it is possible to use the degaussing coil 11 only for degaussing, to provide a separate ring coil for the generation of the DC magnetic field, and generate the DC magnetic field by supplying a DC current to this ring coil. As shown in FIG. 4, the strength of the magnetic field inside the cathode ray tube after an ordinary degaussing process with a degaussing coil 11 is large near the end face of the inner magnetic shield 7 on the side of the electron gun 2, so that by providing the ring coil near the end face of the inner magnetic shield 7 on the side of the electron gun 2, it is possible to attain a sufficient effect even with a small coil. As a result, the influence of the terrestrial magnetism in the tube axis direction (Z-axis direction) can be reduced and the beam displacement can be kept within the tolerance range with little power consumption, so that it is possible to achieve a further cost reduction. In that case, by providing the ring coil with an elliptical shape having a long axis in the Y-axis direction or a rectangular shape that is oblong in the Y-axis direction, it is possible to adjust the correction response at the screen corner portions to the same value as at other locations, so that the influence of the terrestrial magnetism can be lowered uniformly across the entire screen.

Figure 9:
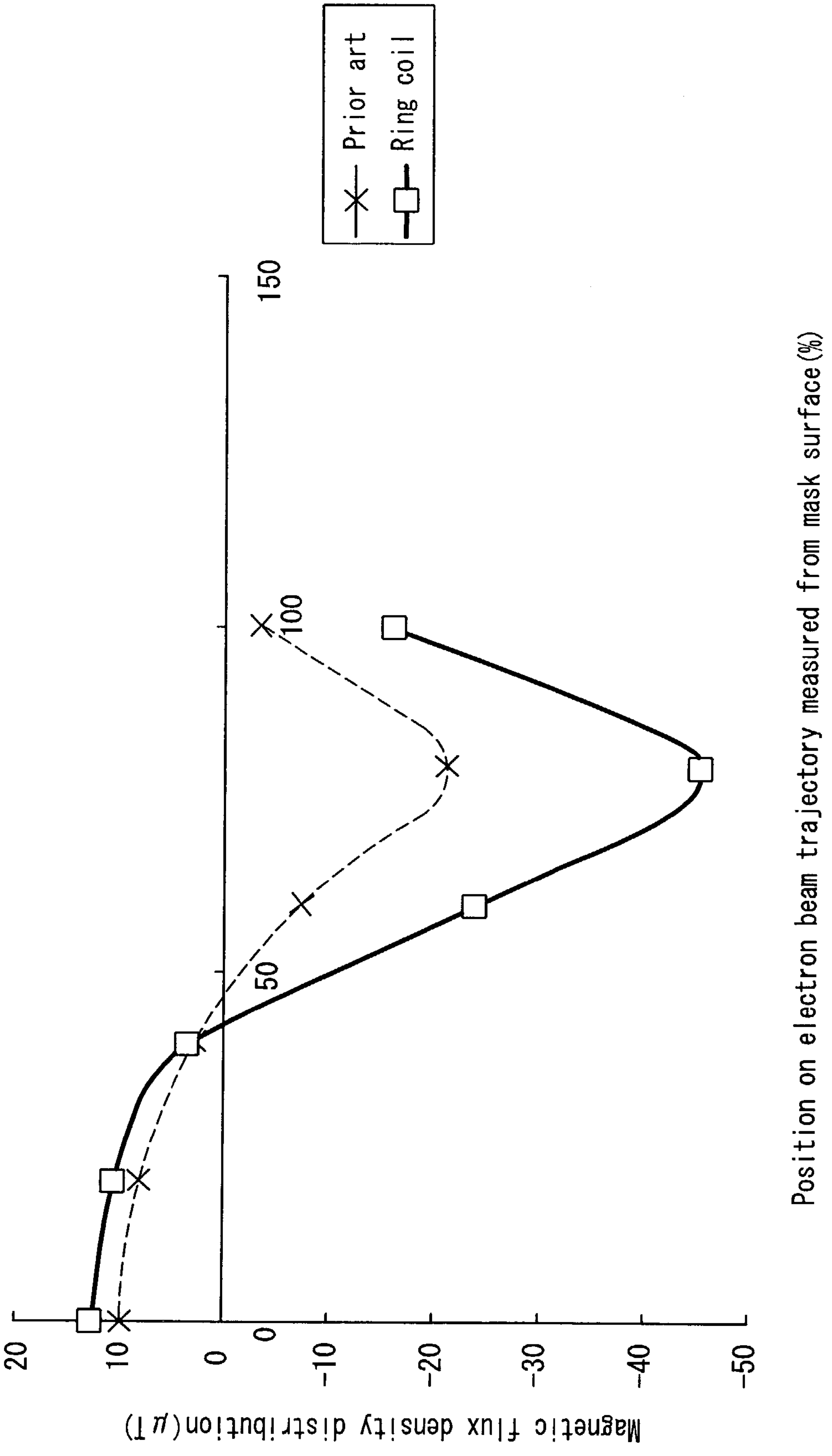
FIG. 9 shows the magnetic flux density distribution in the vertical direction inside a cathode ray tube in accordance with an embodiment of the present invention when a DC current is supplied and when no DC current is supplied to the ring coil.

Using a similar 29" color cathode ray tube as above in which a ring coil of elliptical shape having its long axis in the Y-axis direction is provided near the end face of the inner magnetic shield 7 on the side of the electron gun 2, the inventors measured the magnetic flux density distribution in the Y-axis direction inside the cathode ray tube when a DC current of 40 mA was supplied to the ring coil while performing an ordinary degaussing process. FIG. 9 shows the results (solid line). FIG. 9 also shows the magnetic flux density distribution in the Y-axis direction inside the cathode ray tube when no DC current was supplied to the ring coil (broken line). Also in FIG. 9, as in FIG. 6, the horizontal axis shows the position on the electron beam trajectory measured from the plane of the shadow mask 5 normalized to the distance from the plane of the shadow mask 5 to the deflection center 1 of the electron beam 3. The resulting magnetic flux density distribution is different depending on whether a DC current is superimposed on the degaussing coil 11 (FIG. 6) or the DC current is supplied to the ring coil (FIG. 9), but since it is the total magnetic flux acting on the electron beam that affects the decrease of the influence of the terrestrial magnetism, there is no difference between the effect of the two cases.

As shown in FIG. 1, in the case of a color cathode ray tube equipped with a rotation coil 16 for correcting the tilt of the image, it is also possible to generate the desired DC magnetic field by supplying a desired DC current to that rotation coil 16.

As described above, with the present invention, it is possible to almost completely correct displacements of the trajectory of the electron beam by applying a DC magnetic field, so that the phenomenon of color displacement can be prevented at low cost.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A color cathode ray tube comprising:

a bulb including a face panel having in its inner surface a phosphor screen made of phosphors of a plurality of colors, and a funnel connected to the rear of the face panel;

an electron gun installed in a neck portion of the funnel;

a shadow mask having a plurality of apertures for passing an electron beam emitted from the electron gun, and arranged at a predetermined spacing from the phosphor screen; and an inner magnetic shield extending from a rear portion of the shadow mask toward the electron gun; and a degaussing coil mounted on the outer surface of the funnel;

wherein a DC magnetic field is generated by superimposing a DC current on the degaussing coil during a degaussing process that is performed by supplying an AC degaussing magnetic field to the degaussing coil.

2. The color cathode ray tube according to claim 1, wherein the phosphor screen is a striped phosphor screen made of phosphor stripes of the colors R (red), G (green) and B (blue) extending in a vertical direction (Y-axis direction) of the bulb, which are lined up repeatedly in that order in a horizontal direction (X-axis direction), and the DC magnetic field is applied in the vertical direction.

3. The color cathode ray tube according to claim 2, wherein the DC magnetic field is generated near an end face of the inner magnetic shield on the electron gun side.

4. The color cathode ray tube according to claim 2, wherein the DC magnetic field is applied in vertical symmetry with respect to the tube axis (Z-axis).

5. The color cathode ray tube according to claim 2, wherein a strength and orientation of the DC magnetic field are adjusted in accordance with the strength and orientation of a tube axis component of the terrestrial magnetism.

6. The color cathode ray tube according to claim 1, further comprising a ring coil for generating the DC magnetic field.

7. The color cathode ray tube according to claim 6, wherein the shape of the ring coil is that of an ellipse with a long axis in vertical direction or that of a rectangle that is oblong in vertical direction.

* * * * *